United States Patent [19]

Dery et al.

[11] Patent Number: 5,006,286

[45] Date of Patent: Apr. 9, 1991

[54] POLYMERIC ELECTRICAL INTERCONNECTION APPARATUS AND METHOD OF USE

[75] Inventors: Ronald A. Dery, Winston-Salem; Frederick R. Deak; Richard H. Zimmerman, both of Kernersville, all of N.C.

[73] Assignee: AMP Incorporated, Harrisburg, Pa.

[21] Appl. No.: 845,914

[22] Filed: Mar. 31, 1986

[51] Int. Cl.$^5$ .................... H01R 3/00; B29C 63/18; B29C 65/48

[52] U.S. Cl. .................... 264/40.2; 174/76; 174/84 R; 174/88 R; 174/DIG. 8; 264/104; 264/230; 264/277; 439/86; 439/178

[58] Field of Search ................ 264/104, 105, 36, 40.1, 264/40.2, 230, 271.1, 275, 277; 156/49; 174/DIG. 8, 21 JS, 84 S, 88 S, 84 R, 76, 88 R; 439/86, 276, 178

[56] References Cited

U.S. PATENT DOCUMENTS

| | | | |
|---|---|---|---|
| 2,304,667 | 12/1942 | Taylor | 264/40.2 |
| 2,305,473 | 12/1942 | Hayford | 156/49 |
| 3,451,609 | 6/1969 | Gillett | 174/DIG. 8 |
| 3,503,034 | 3/1970 | Appleton . | |
| 3,525,799 | 8/1970 | Ellis | 174/84 |
| 3,538,240 | 11/1970 | Sherlock | 174/88 |
| 3,723,590 | 3/1973 | Anderson | 264/104 |
| 4,027,936 | 6/1977 | Nemoto et al. . | |
| 4,151,364 | 4/1979 | Ellis | 174/DIG. 8 |
| 4,283,596 | 8/1981 | Vidakovits et al. | 174/84 |
| 4,395,375 | 7/1983 | Ferris et al. | 264/40.1 |
| 4,421,370 | 12/1983 | Treakle et al. . | |
| 4,484,022 | 11/1984 | Eilentropp | 156/49 |
| 4,500,371 | 2/1985 | De Groot | 174/DIG. 8 |
| 4,580,874 | 4/1986 | Winter et al. | 264/1.5 |
| 4,654,473 | 3/1987 | Roux et al. | 174/DIG. 8 |

FOREIGN PATENT DOCUMENTS

| | | | |
|---|---|---|---|
| 1431167 | 4/1976 | United Kingdom | 174/DIG. 8 |
| 2109418 | 6/1983 | United Kingdom | 174/DIG. 8 |

OTHER PUBLICATIONS

Adhesives For Industry (Jun. 24–25, 1980) pp. 70–90.

"Development of Electrical Conduction in Silver-Filled Epoxy Adhesives", vol. 10, Journal of Adhesion, pp. 1-15, (1979) by A. J. Lovinger.

"Polymerization Behaviour of Silver-Filled Epoxy Resins by Resistivity Measurements", vol. 10, Journal of Applied Polymer Science, pp. 217-228, (1966) by B. Miller.

*Primary Examiner*—James Lowe

*Attorney, Agent, or Firm*—Robert W. Pitts

[57] ABSTRACT

Polymeric electrically conductive apparatus such as electric connectors are disclosed. These connectors employ a polymeric conductive material such as a conductive epoxy having conductive particles dispersed therein sufficient to establish electrical conductivity. These conductive materials are at least initially deformable such that electrical conductors may be inserted within an envelope containing the conductive material and electrical continuity for a prescribed circuit can be verified before structurally affixing the conductors to the envelope. Embodiments having radially collapsible envelopes for forming splice connectors and multicontact configurations employing rigid dielectric housings are disclosed.

24 Claims, 6 Drawing Sheets

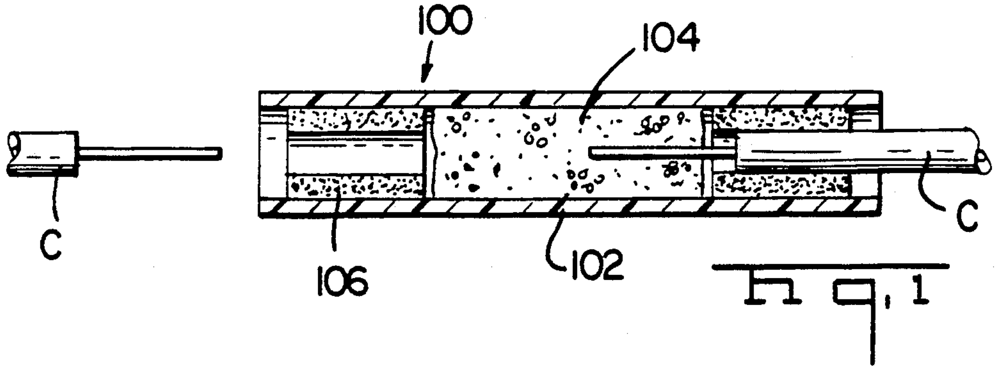
Fig. 1
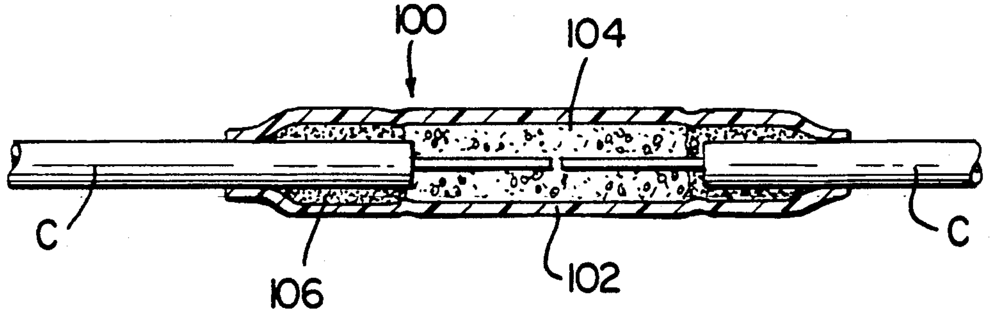
Fig. 1A
Fig. 3
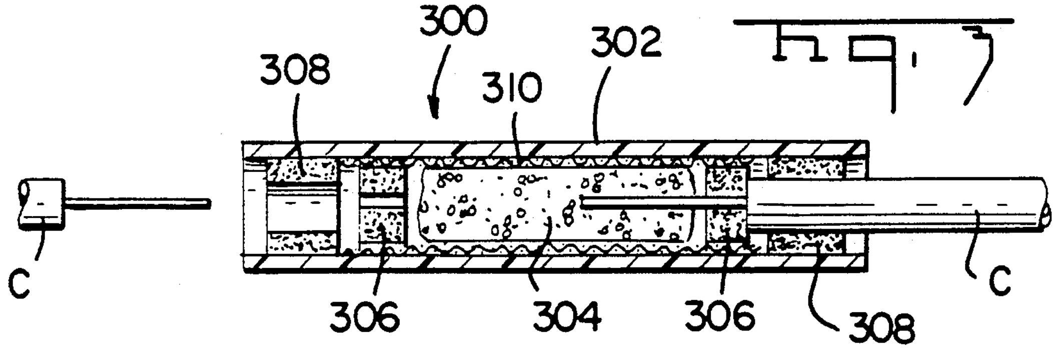
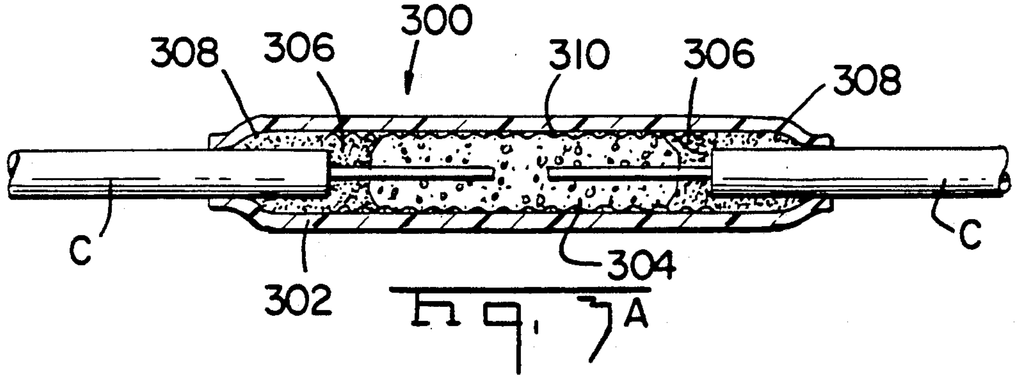
Fig. 3A

POLYMERIC ELECTRICAL INTERCONNECTION APPARATUS AND METHOD OF USE

BACKGROUND OF THE INVENTION

1. Field of the Invention

This invention relates to the interconnection of a plurality of electrical conductors such as discrete insulated wires, ribbon cable conductors, flat cable conductors, or the interconnection of a wire or cable to an electrically conductive terminal. This invention also relates to the interconnection of conductors using polymeric electrically conductive materials to form the interconnection.

2. Description of the Prior Art

Polymeric electrically conductive materials, such as conductive epoxies and thermoplastic adhesives, have been used, though perhaps not extensively, to establish interconnections of electrical circuitry. For example, conductive epoxies have been employed to mount electrical components on printed circuit boards. Polymeric electrically conductive adhesives have also been employed in tape form to interconnect conductors on a substrate with other components or circuitry. When used to establish such electrical interconnections, these conductive epoxies and conductive adhesives can be deposited on a surface in a conventional manner, such as by screen printing. Then upon the application of heat and pressure or upon the application of pressure, depending upon the precise character of the conductive adhesive, both electrical and structural or mechanical integrity can be established between separate conductors.

The application of heat to make an electrical interconnection is not limited to use with a conductive adhesive or conductive epoxy. For example, U.S. Pat. No. 3,525,799 discloses a heat recoverable connector formed from a heat shrinkable tubular member containing a fusible insert. That patent discloses the use of a dimensionally heat unstable recoverable sleeve with an internal ring of solder deposited therein. The ends of electrical conductors can be positioned within the solder ring and the entire assembly heated so that the sleeve shrinks and the solder melts to join the two conductors. The sleeve then protects the electrical interconnection formed by the solder. U.S. Pat. No. 4,283,596 discloses a similar electrical connector employing a heat shrinkable sleeve and a fusible solder insert. Each of these patents essentially shows a splice interconnection device. In both instances, once the splice has been made by the application of heat to cause the solder to flow into contact with the conductors and to cause the outer sleeve to shrink, the interconnection will become permanent. These devices offer no opportunity to verify or test the circuit before a permanent interconnection is made.

U.S. Pat. No. 3,538,240 discloses an electrical connector in which a heat shrinkable material is used in conjunction with spring biased contacts. This connector does permit interconnections to be checked prior to the application of heat to the body of the housing. This device, however, relies upon a combination of the spring loading of the individual terminals and the force which could be exerted by the housing material after shrinkage. Fusion of the conductors, by use of a fusible and solder insert such as that shown in U.S. Pat. No. 3,538,240, in part because of the lack of resiliency of solder material. The instant invention not only permits the verification of electrical continuity within a circuit, before the interconnections are made, but also forms a bonded interconnection between the conductors. This invention is also especially adapted to sealing the interconnection between conductors from the environment.

SUMMARY OF THE INVENTION

The preferred embodiment of this invention is an apparatus, such as an electrical connector, for forming an electrically bonded interconnection between electrical conductors. The preferred embodiment of this invention is also adapted to the interconnection of electrical conductors such as wire or cable directly to an electrically conductive component. The apparatus comprises an envelope, housing, or casing in which a polymeric electrically conductive material is disposed. The envelope can comprise a heat shrinkable tubing or it can comprise a dimensionally stable dielectric housing. The envelope can form a single cavity in which the polymeric electrically conductive material is deposited or the envelope can comprise a multicavity housing used to permit a plurality of interconnections to be made in the same device. The polymeric electrically conductive material can comprise a conductive adhesive, a conductive epoxy, a conductive grease, conductive putty; or a conductive gel. This conductive material is at least initially in a deformable electrically conductive state such that the electrical conductors can be inserted into the material and removed from the material. An electrical interconnection will be established by material in a viscous flowable state or by a deformable gel. After the electrical connection is verified to determine that the appropriate circuit has been indeed formed either within the connector or to the appropriate apparatus, the conductors can be structurally affixed to the envelope. In the preferred embodiment of this invention, a dielectric non-conductive adhesive activated by the application of heat is employed to structurally affix the conductors to the envelope. The electrically conductive material in the preferred embodiment of this invention can comprise a conductive adhesive having a plurality of electrically conductive particles, sufficient to maintain electrical conductivity dispersed therein. This conductive adhesive can also take on a permanent set and at least contribute to the structural affixation of the conductors to the envelope or outer housing or sleeve. It should be understood, however, that conductive putty, and conductive grease, which maintain their viscous states and do not take on a permanent set can also be used as an element of this invention. This invention not only permits electrical continuity to be verified in a single connector before the interconnection is made permanent, but also permits entire harnesses, even including associated active devices, to be electrically verified prior to the permanent assembly of the harness.

BRIEF DESCRIPTION OF THE DRAWINGS

FIG. 1 is an embodiment of this invention in the form of a splice having heat shrinkable tubing surrounding a conductive material and a structural adhesive.

FIG. 3 is an embodiment of a splice similar to that of FIG. 2 but showing a metallic braid used instead of the metallic sleeve.

FIGS. 3 and 4 show the use of separate structural adhesives and separate sealing inserts.

FIG. 5 is a view of a multiconductor connector embodying this invention in which the connector can be attached to a conventional connector.

FIGS. 1A-7A correspond respectively to FIGS. 1-7 but show the connectors of FIGS. 1-7 in the terminated configuration.

DETAILED DESCRIPTION OF THE PREFERRED EMBODIMENTS

Figure 2:
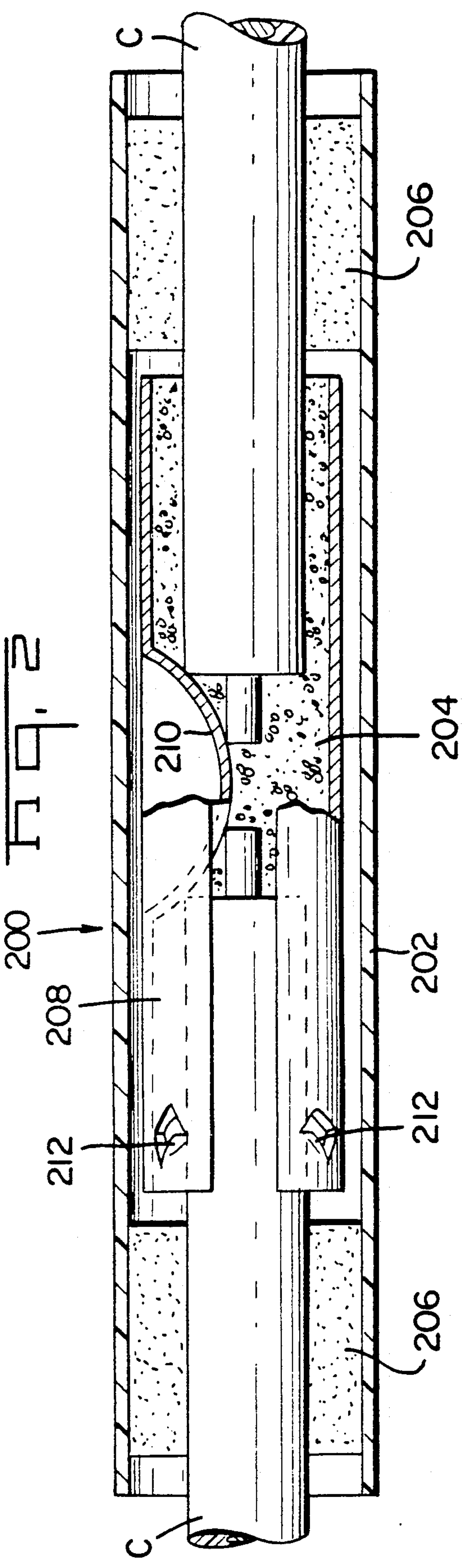
FIG. 2 is another embodiment of this invention in the form of a splice employing a metallic sleeve within a heat shrinkable tubing.
Figure 2A:
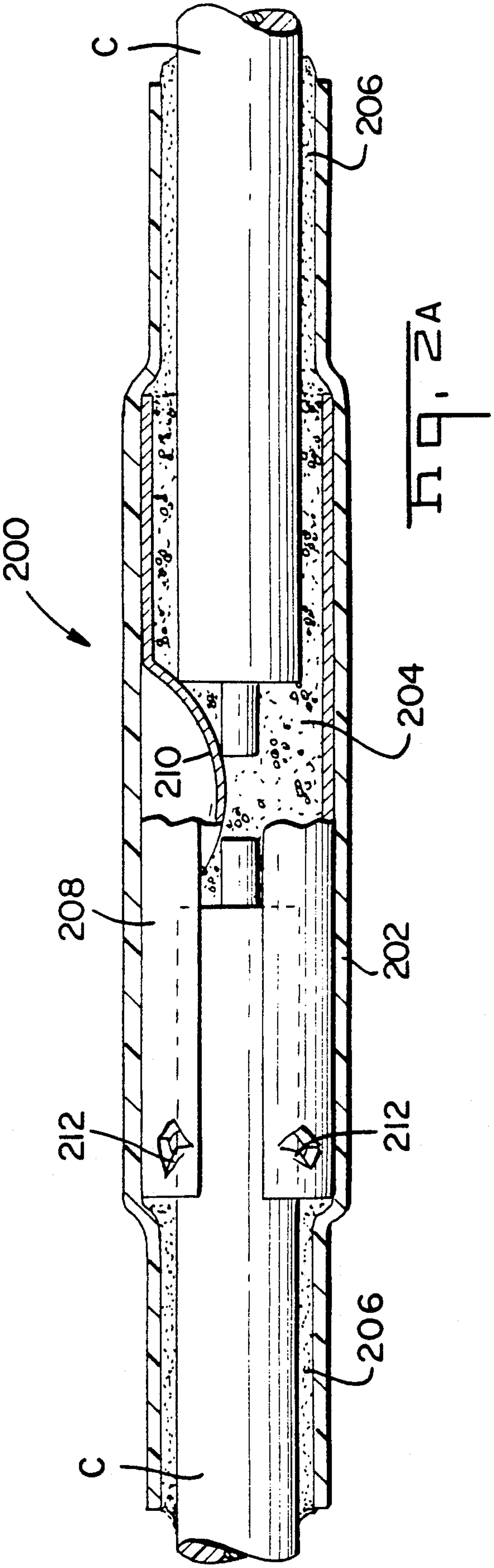

A number of different types of electrically conductive materials can be employed in this invention. Conductive epoxies, thermoplastic conductive adhesives, conductive greases, conductive putty, or conductive silicone gels would be suitable for use in establishing the electrical interconnections which can be achieved by use of the preferred embodiments. Each of the polymeric electrically conductive materials employed in the various embodiments of this invention must, however, be electrically conductive in an at least initially deformable state such that electrical conductors can be inserted into the conductive material and removed from the conductive material, if it is determined that corresponding electrical conductors have not been interconnected. Two examples of an electrically conductive epoxy suitable for use in this invention are set forth as follows. The first electrically conductive epoxy has a silver loading of 50 percent. The resin consists of 50 percent silver flakes together with a 41.6 percent epoxy such as Ciba-Geigy 6010 epoxy and 8.4 percent dibutyl phthalate. A hardener consisting also of 50 percent silver flakes also includes 41.6 percent triethanolamine and 8.4 percent dibutyl phthalate. A 60 percent silver loaded epoxy would include 32.9 percent by weight Ciba-Geigy 6010 epoxy and 7.1 percent dibutyl phthalate. The hardener would also contain 60 percent by weight silver particles and 32.9 percent by weight triethanolamine and 7.1 percent dibutyl phthalate. Equal parts resin and hardener would be mixed and cured 300° F. for 20 minutes to form the viscous conductive adhesive deposited within the connector housing. A conductive gel suitable for use in practicing this invention is disclosed in U.S. Pat. No. 4,770,641 filed on the same date as this application and incorporated herein by reference. It will be appreciated that these examples are by way of illustration only and that other viscous electrically conductive adhesive or conductive gel materials would be obvious to those skilled in the art.

Each of the various structural embodiments of this invention shown in FIGS. 1-7 employs essentially the same elements, although perhaps in somewhat different arrangements, to establish a verifiable electrical connection in which conductors are bonded together by the conductive material disposed within an envelope. In so far as possible similar numbers are employed to refer to similar elements in the various embodiments, for example 104, 204, 304, 404, 504, 604, and 704 all refer to the polymeric conductive material. FIGS. 1 and IA disclose a splice connector 100 employing a viscous polymeric conductive material 104 disposed within a cylindrical envelope 102 comprising a conventional heat shrink tubing. A fusible dielectric polymeric adhesive 106 is also disposed within the cavity formed by the envelope but outwardly of the inner conductive material 104. Note that a conductor C can be inserted within the envelope such that the conductive core enters the polymeric conductive material 104. In this and other embodiments, the conductor C is shown with the end of the insulation stripped to expose a substantial length of the inner conductive core. However, if sufficient surface area for carrying the required current can be exposed simply by inserting the end of an unstripped conductor into the conductive adhesive, the stripping operation could be eliminated. Since the conductive material is in a viscous and therefore flowable state when the conductors C are initially inserted, the conductors can be withdrawn in the event of an error prior to permanently interconnecting the device. A conventional dielectric heat activated adhesive 106 will establish a structural interconnection between the conductor C and the heat shrink tubing or envelope 102 upon the application and subsequent withdrawal of heat to the splice connector shown in FIG. 1. The conductors can be structurally affixed to the envelope after the interconnection has first been verified. Note that a conductive adhesive, such as the epoxy described above, is also heat activated, and this conductive material will also provide structural strength to the interconnection.

FIG. 2 is another embodiment of the invention quite similar to the embodiment of FIG. 1, but including additional structure to provide a strain relief for the conductors. A metallic sleeve 208 is added between the outer heat shrink tubing envelope 202 and the inner conductive material 204 to form this splice connector 200. The metallic sleeve, which can be either split or cylindrically continuous, includes an inner stop 210 in the form of a dimple stamped into the surface of the tubular member. This stop 210 serves to position the two conductors C such that the stripped ends of the conductors will be disposed within the viscous bulk conductive adhesive or bulk conductive material 204. Barbs 212 struck inwardly into the sleeve 208 engage the insulation to provide strain relief, especially after the application of heat which radially collapses the heat shrinkable tubing. The configuration of the barbs 212 can be chosen such that the conductors C can be withdrawn if the proper splice interconnection is not indicated prior to permanent attachment of the device. The material 206 disposed at the ends of the sleeve 208 can either be a fusible sealing insert or a structural adhesive for securing the conductors to the heat shrinkable tubing envelope and metallic sleeve 208. Of course a dielectric conductive adhesive would normally be used and would serve both to seal the splice connector and to structurally secure the conductors to the outer envelope.

FIG. 3 also shows an embodiment which is quite similar to that of FIG. 2. A metal braid 310 has, however, been substituted for the metal tube 208. FIG. 3 also shows an embodiment including a first structural adhesive 306 and is positioned to engage the inner conductive core whereas the outer sealing insert 308 is positioned to engage the insulation of the stripped wire. Note that inserts 306 and 308 could both be formed of a dielectric adhesive which would serve both to structurally affix the conductors to the splice connector envelope and to seal the envelope. Inserts 306 and 308 could be combined as a single component.

Figure 4:
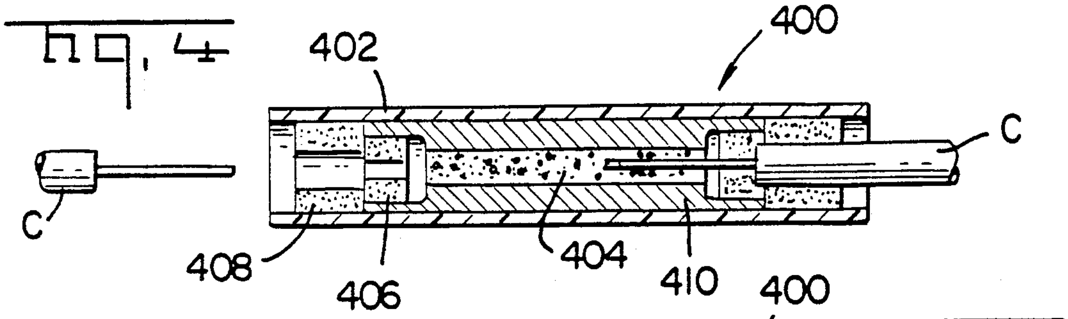
FIG. 4 is a view of a fourth embodiment of a splice in which a cylindrical tubular member is used instead of the metallic sleeve or the braid.
Figure 4A:
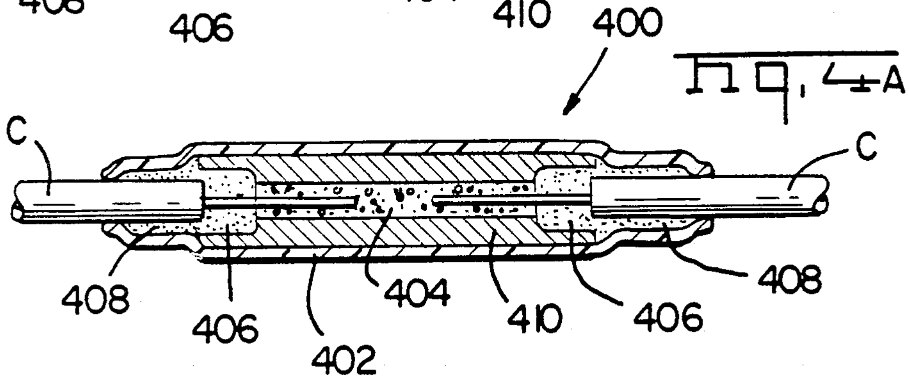

FIG. 4 is quite similar to FIG. 3 but shows a connector in which a simple metallic tubular member 410 is substituted for either the braid 310 or the metallic sleeve 208. Splice connector 400 employs a polymeric conductive material 404 in conjunction with a dielectric structural adhesive 406 and a sealing insert 408 within an outer heat shrink tubing or envelope 402 in much the same manner as the embodiment of FIG. 3.

Figure 7:
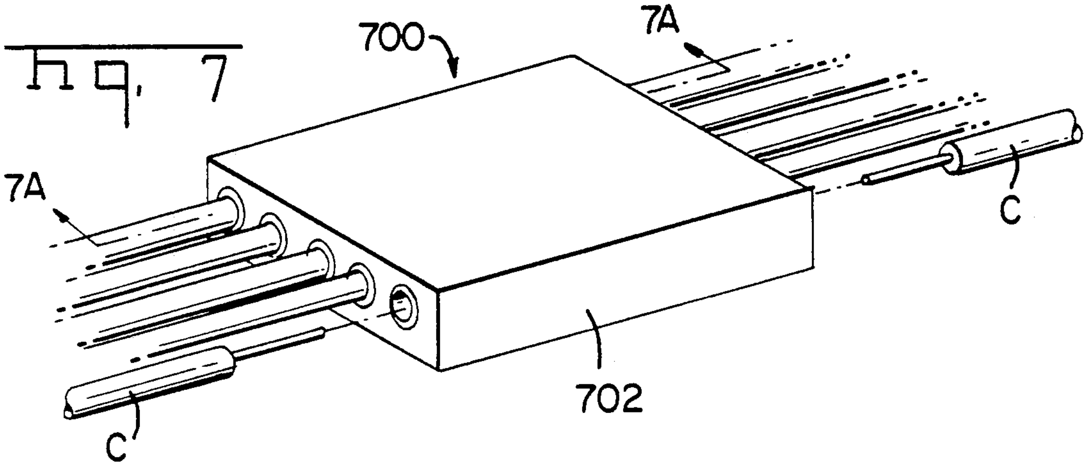
FIG. 7 is another embodiment of a multiconductor-connector in which two conductors are interconnected by the same body of electrically conductive material located within a multicavity dielectric housing.
Figure 7A:
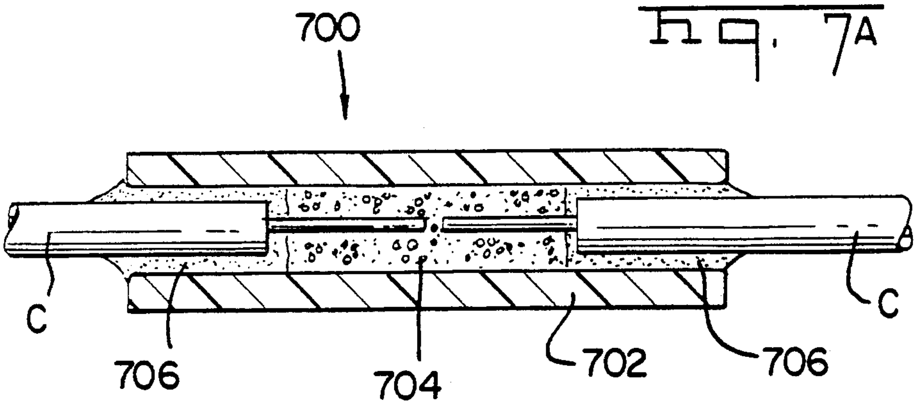
Figure 7A:
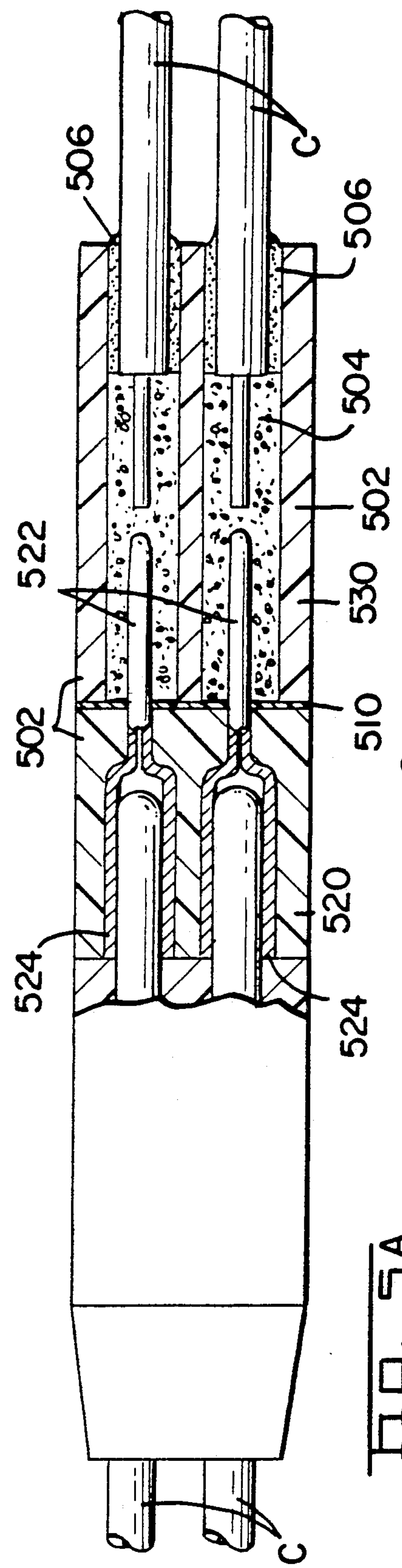
Figure 7:
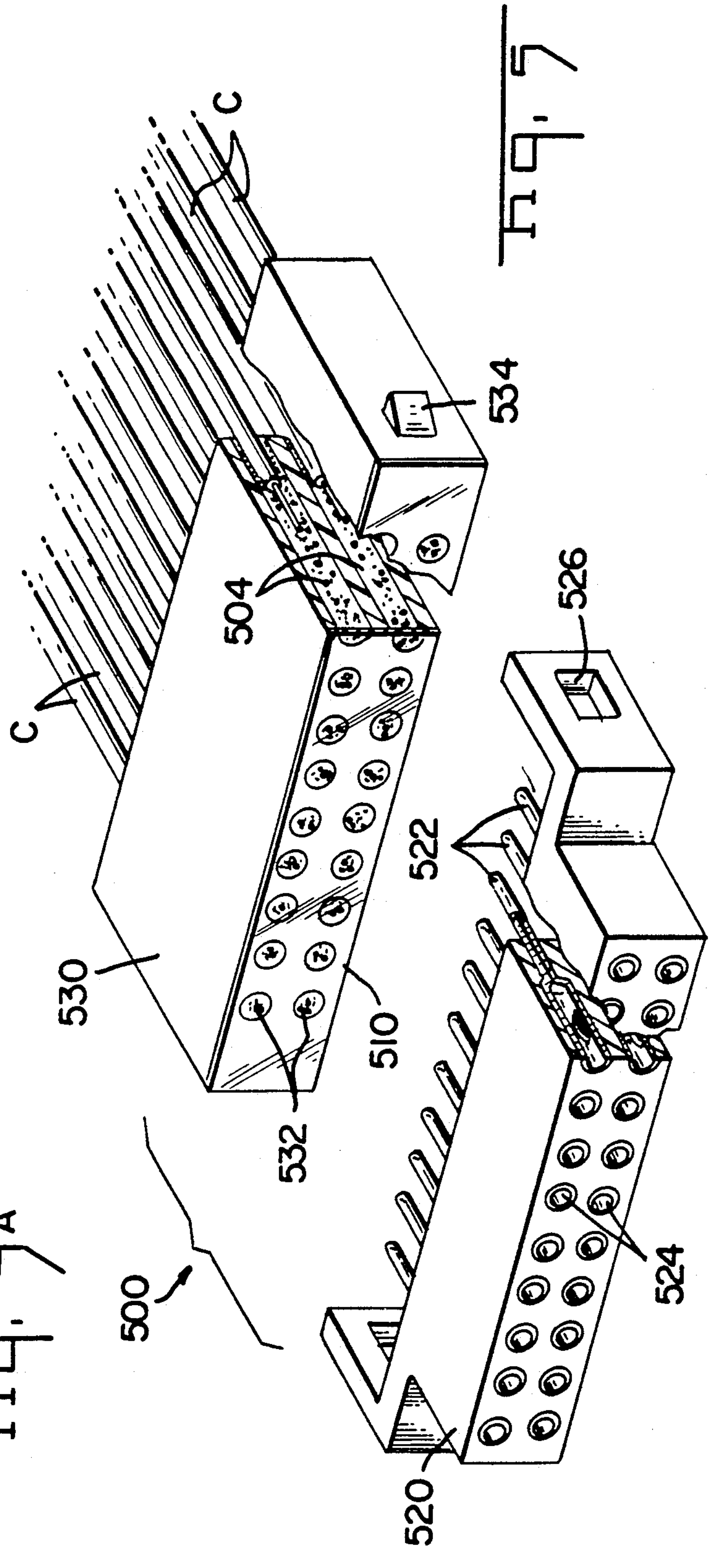
Figure 6A:
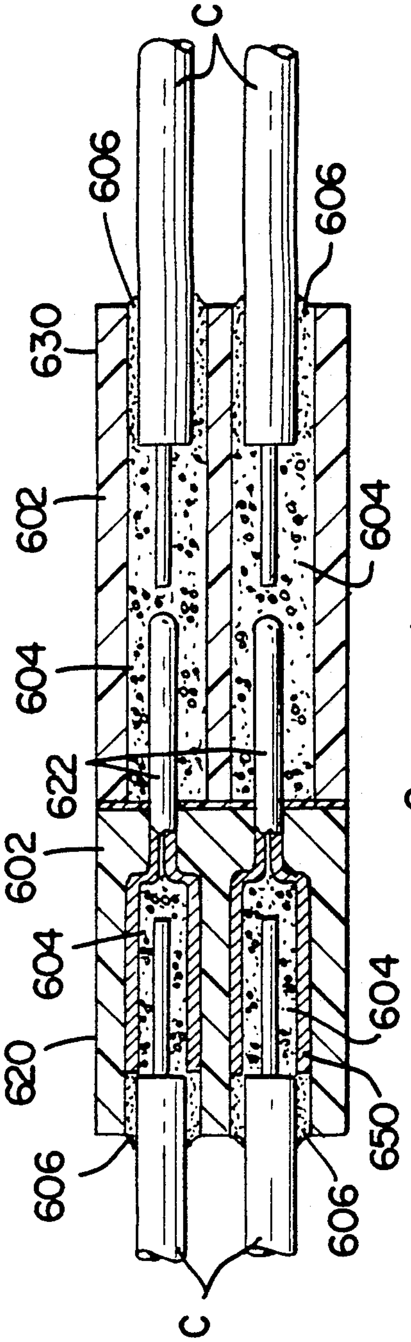
FIG. 6 is another embodiment of a multiconductor connector embodying this invention in which each connector half employs this invention to interconnect a conductor to either a male or female terminal.
Figure 6:
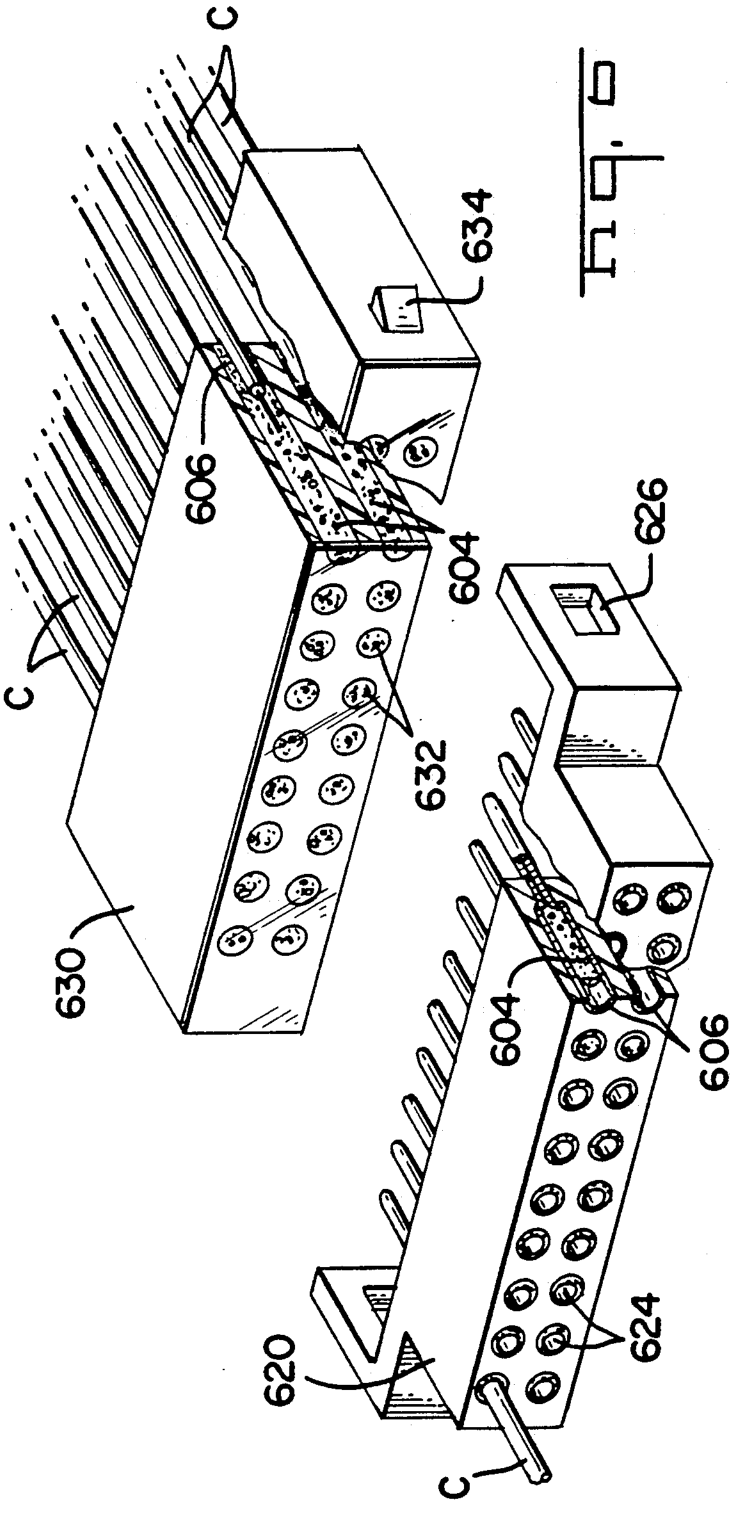

The splice connectors of FIGS. 1-4 are intended to interconnect only two conductors. This invention is, however, suitable for use in a multiconductor configuration such as that shown in FIGS. 5-7. FIGS. 5-7 demonstrate the versatility of this invention. FIG. 5 discloses a connector 500 comprising two separate components 520 and 530. This connector 500 is intended for interconnection to a conventional multicontact connector. The connector component 530 comprises a rigid dielectric housing formed of a conventional insulative plastic material which forms an envelope 502 having a plurality of individual cavities 532. These cavities 532 are open-ended and each cavity contains a viscous polymeric conductive adhesive 504. A dielectric polymeric adhesive 506 is contained within the cavities adjacent the outer face of the cavity. A thin membrane 510 is located adjacent the inner face of the two-sided cavity. Membrane 510 serves only to contain the viscous conductive material within the cavity. The other part of connector 500 consists of a plurality of conventional terminals having a pin section 522 and a receptacle portion 524 mounted within an insulative housing 502 and serves as an adapter for interconnection to a conventional connector. The receptacle terminals 524 and the configuration of the insulating housing are suitable for mating to standard connectors and terminals. Latches 526 and 534 are located on the respective connector parts 520 and 530 such that parts 520 and 530 can be secured to each other. When these two connector parts are mated, the pins 522 penetrate the membrane 510 and extend into the cavities 532. Pins 522 can either be employed to make direct contact with the conductive adhesive 504 or a separate receptacle portion can be positioned within cavity 532 and within polymeric conductive adhesive 504 if desired. Again, the conductor C can be inserted into the cavities of connector 500 to permit verification of the electrical circuitry before permanent interconnection is made. Note that this invention is especially useful with multicavity dielectric housings in which discrete conductors C are employed, since the possibility of operator error in positioning a particular conductor C with a specific cavity 532 is always possible. Although FIG. 5 shows a dual row pin and socket connector configuration, it should be understood that this configuration is representative only. Other conventional connector configurations, such as edge card connectors, miniature ribbon connectors, D connectors and others could use this basic approach.

FIG. 6 discloses another embodiment of a multicontact connector comprising two component parts 620 and 630. Part 620 serves to hold a male contact or pin 622. The cavities 632 in connector part 630 contain polymeric conductive material 604 and are adapted to receive pin 622. Electrical interconnection between the conductor C and the respective pin 622 or socket 650 is made in the same manner as previously described and verification of electrical continuity before interconnection of conductors to the respective terminals is possible in the same manner as discussed previously.

FIG. 7 is still another embodiment of a multicontact electrical connector in which multiple conductors are interconnected within a single housing containing a plurality of cavities. Thus, the pins and sockets of connectors 500 and 600 are unnecessary. Verification of the electrical interconnection before permanently securing the conductors to the connector housing is still possible, however.

Figure 8:
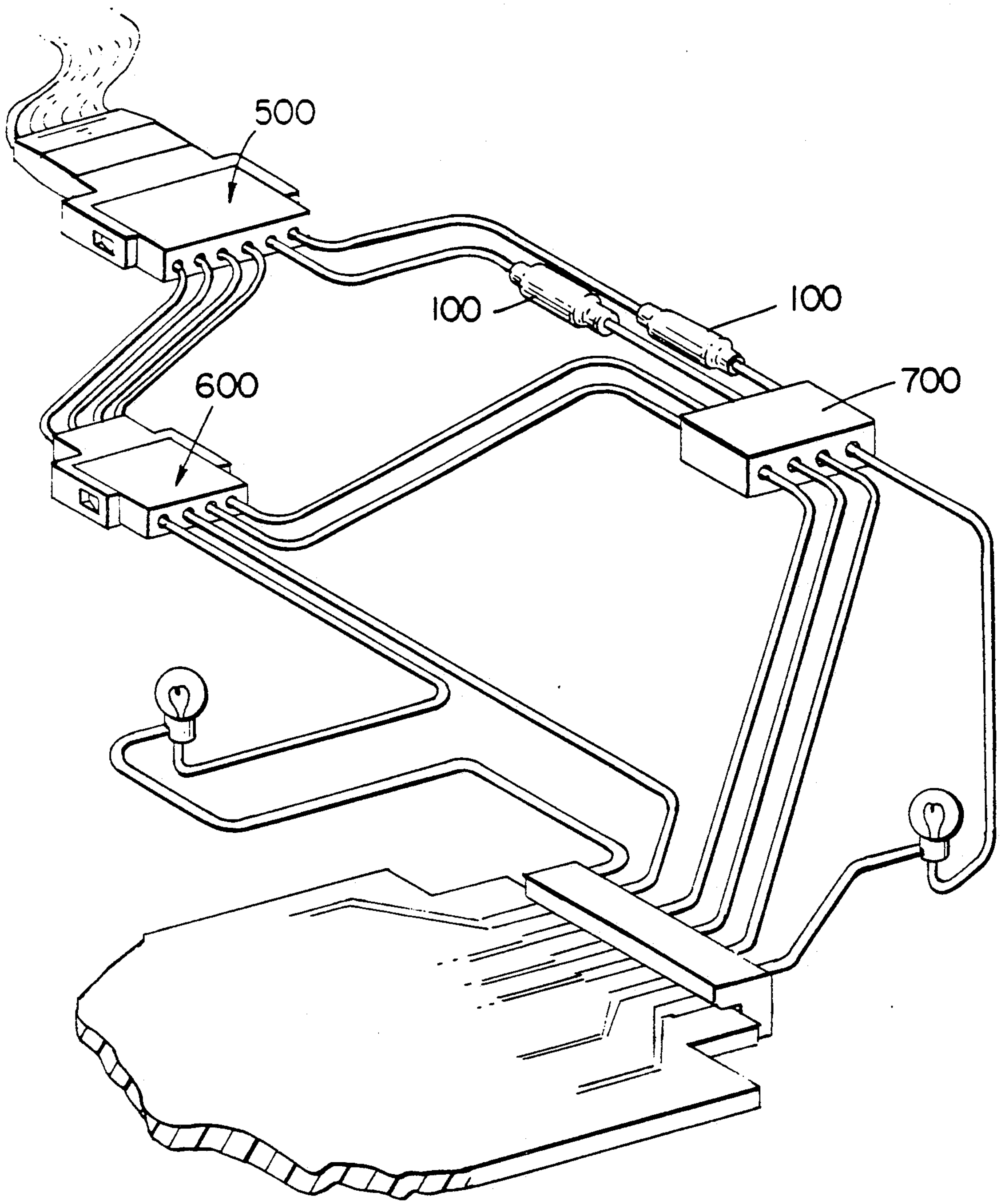
FIG. 8 is a view of a harness assembly incorporating various embodiments of this invention in a manner in which the electrical circuitry to be formed by the harness can be verified before permanent interconnection of the conductors.

These various embodiments of electrical connectors are intended to be illustrative only. Note that this invention is applicable not only to interconnection of separate conductors such as wires or cable, but also the interconnection of a conductor to an electrically conductive component. Not only is this invention of significance with respect to the interconnection of an individual connector, but this invention is especially significant in the assembly of an electrical harness containing a plurality of components and a plurality of electrical conductors, and even including associated active devices. FIG. 8 schematically illustrates a harness containing a plurality of multicontact connectors and splice connectors embodying this invention. Note that the entire harness can be wired and completely verified or checked out prior to the application of heat to the various components to complete the structural assembly of the harness.

Conductive and nonconductive adhesives are represented in the accompanying drawings by legends adopted specifically for use herein. It should be understood that these legends are not intended to depict the actual structure or composition of the adhesives, nor are the conductive particles used in the conductive adhesive explicitly depicted.

This invention can be practiced in a number of embodiments as is apparent from the various embodiments employed herein. The use of a polymeric conductive adhesive containing conductive particles dispersed within a dielectric adhesive medium in a sufficient proportion to establish electrical conductivity is only the preferred form of the conductive material. Silicone gels or other gels which do not rigidify upon the application of heat and retain their deformable character can also be employed. Note that a number of types of rigid dielectric housings or envelopes comprising annularly radially collapsible members such as heat shrink tubing or metallic tubing can be employed in devices incorporating this invention. Therefore, the appended claims are directed to these various embodiments which would be obvious to one skilled in the art and are not intended to be limited to the specific structures shown herein.

What is claimed:

1. Apparatus for forming an electrically bonded interconnection between electrical conductors, comprising: an envelope containing a polymeric electrically conductive material disposed therein, the conductive material within the envelope being at least initially in a deformable, electrically conductive state such that an electrical conductor can be inserted therein and removed therefrom, and means for structurally affixing an electrical conductor to the envelope after insertion of the conductors into the polymeric electrically conductive material, the conductive material establishing electrical continuity with the electrical conductors prior to structural affixation of the conductor to the envelope, whereby electrical continuity can be verified prior to permanent attachment of the conductor to the apparatus.

2. The apparatus of claim 1 wherein the means for structurally affixing the electrical conductor to the envelope comprises a polymeric adhesive, flowable upon the application of heat.

3. The apparatus of claim 2 wherein the polymeric adhesive comprises a dielectric material, the dielectric polymeric adhesive being flowable upon application of heat to seal the envelope upon solidification.

4. The apparatus of claim 3 wherein the polymer is conductive material comprises a bulk conductive adhesive.

5. The apparatus of claim 4 wherein the dielectric polymeric adhesive is disposed within the envelope outwardly of the bulk conductive adhesive.

6. The apparatus of claim 5 where in the envelope comprises a dielectric housing having at least one open-ended cavity therein.

7. The apparatus of claim 6 wherein the cavity is open on two sides of the housing, separate electrical conductors being insertable into the cavity on each side, bulk conductive adhesive being confined on opposite sides within the cavity by the dielectric polymeric adhesive.

8. The apparatus of claim 1 wherein the conductive material is initially in a viscous state.

9. The apparatus of claim 5 wherein the envelope comprises a two-part dielectric housing, the first housing having a cavity extending therethrough, dielectric polymeric adhesive being disposed along an inner face, the bulk conductive adhesive being disposed in the cavity between the dielectric polymeric adhesive and the membrane, the second housing having at least one terminal disposed therein, the terminal being partially insertable through the membrane into the first housing cavity, whereby assembly of the first and second housings forms an electrical connector half matable with a corresponding connector half for interconnecting an electrical conductor inserted into the first housing cavity to a corresponding electrical conductor attached to the second connector half.

10. The apparatus of claim 4 wherein the envelope comprises an annular radially collapsible member.

11. The apparatus of claim 10 wherein the annular radially collapsible member comprises heat shrinkable tubing.

12. The apparatus of claim 10 further comprising a metallic sleeve surrounding the bulk conductive adhesive and within the heat shrinkable tubing.

13. The apparatus of claim 12 wherein the metal sleeve comprises strain relief means for engaging insulation surrounding the electrical conductors.

14. The apparatus of claim 1 wherein the polymeric electrically conductive material comprises a dielectric medium containing conductive particles dispersed therein in sufficient proportion to establish electrical continuity therethrough.

15. The apparatus of claim 1 further comprising sealing means flowable under the application of heat for sealing the electrical interconnection of the polymeric electrically conductive material to the conductors after verification of electrical continuity.

16. The apparatus of claim 1 wherein one of the conductors comprises a terminal of conductive material inserted partially within the envelope.

17. The apparatus of claim 16 wherein the terminal comprises a pin terminal having a cylindrical barrel, electrically conductive material being disposed within the barrel, the other conductor being insertable within the barrel.

18. Apparatus for electrically interconnecting a plurality of electrical conductors to form at least one electrical circuit, the interconnection of a plurality of separate conductors being verifiable prior to permanent interconnection, the apparatus comprising at least one electrical connector including an envelope containing a polymeric electrically conductive material disposed therein, the polymeric electrically conductive material within the envelope being at least initially in a deformable, electrically conductive state such that an electrical conductor can be inserted therein and removed therefrom, and means for structurally affixing the electrical conductor to the envelope after insertion of the conductors into the polymeric electrically conductive material, after verification that the plurality of separate conductors are properly interconnected to establish the desired electrical circuit.

19. The apparatus of claim 18 wherein in the envelope is defined by multicavity dielectric housing, polymeric electrically conductive material being disposed within the dielectric housing cavities.

20. A method of assembling an electrical harness having a plurality of separate conductors extending between and among a plurality of electrical components in the harness, the harness including a plurality of electrical interconnections, the method comprising the steps of:

interconnecting the conductors by positioning the conductors in a polymeric electrically conductive material disposed within an envelope, the polymeric electrically conductive material being at least initially in a viscous, electrically conductive state such that the electrical conductor can be inserted therein and removed therefrom., verifying that the prescribed interconnections within the electrical harness have been made after insertion of conductors into the polymeric electrically conductive material, and rewiring the harness while the electrically conductive material is in the viscous electrically conductive state to correct any harness wiring errors; and subsequently structurally affixing the conductors to the envelope after the electrical interconnections in the harness are verified.

21. The method of claim 20 wherein the conductors are affixed to the envelope by the application of a subsequent withdrawal of heat.

22. The method of claim 21 wherein the electrical interconnections are sealed by application of heat to a dielectric material contained within the envelope concomitant with the application of heat to structurally affix the conductors to the envelope.

23. A method of assembling an electrical harness having a plurality of separate conductors extending between and along a plurality of active electrical components in the harness, the method comprising the steps of:

interconnecting the active components to the harness by positioning the conductors in a polymeric electrically conductive material disposed within an envelope, the polymeric electrically conductive material being at least initially in a deformable, electrically conductive state such that the electrical conductor can be inserted therein and removed therefrom;

verifying that the functionality of the active components within the electrical harness after interconnection thereof to the polymeric electrically conductive material, and replacing nonfunctional active components while the electrically conductive material is in the deformable electrically conductive state to correct any harness wiring errors; and subsequently structurally affixing the conductors to the envelope after the electrical interconnections in the harness are verified.

24. Apparatus for forming an electrically bonded interconnection between electrical conductors, comprising: a dielectric envelope; at least one metallic tubular member disposed within the envelope; a polymeric electrically conductive material disposed within the metallic tubular member; the envelope and the metallic tubular member having at least one open end; and means for structurally affixing an electrical conductor extending into the metallic tubular member within the envelope whereby an exposed portion of the electrical conductor is surrounded by the metallic tubular member with the polymeric electrically conductive material being within the annular area between the metallic tubular member and the exposed portion of the electrical conductor.

* * * * *

UNITED STATES PATENT AND TRADEMARK OFFICE
CERTIFICATE OF CORRECTION

PATENT NO. : 5,006,286
DATED : April 9, 1991
INVENTOR(S) : Richard Henry Zimmerman, et. al.

It is certified that error appears in the above-identified patent and that said Letters Patent is hereby corrected as shown below:

In column 7, claim 4, line 16, remove the word "is".

In column 7, claim 6, line 22, the words "where in" should be --wherein--.

Signed and Sealed this

Eighteenth Day of August, 1992

*Attest:*

DOUGLAS B. COMER

*Attesting Officer*

*Acting Commissioner of Patents and Trademarks*